United States Patent [19]

Van Santbrink et al.

[11] Patent Number: 5,113,432
[45] Date of Patent: May 12, 1992

[54] ARRANGEMENT FOR CONNECTING A TELEFAX DEVICE OR A TELEPHONE SET TO A TELECOMMUNICATION LINE

[75] Inventors: Ronald B. Van Santbrink, Muiden; Willem H. M. De Vries, Rhenen, both of Netherlands

[73] Assignee: U.S. Philips Corporation, New York, N.Y.

[21] Appl. No.: 608,404

[22] Filed: Nov. 2, 1990

[30] Foreign Application Priority Data

Nov. 7, 1989 [NL] Netherlands ............... 8902743

[51] Int. Cl.[5] .......................................... H04M 11/00
[52] U.S. Cl. ................................. 379/100; 379/88; 379/102
[58] Field of Search ................. 379/100, 93, 96–98, 379/102, 104, 105, 67, 88; 358/434, 436

[56] References Cited

U.S. PATENT DOCUMENTS

| | | | |
|---|---|---|---|
| 4,800,439 | 1/1989 | Yoshino | 379/100 |
| 4,815,121 | 3/1989 | Yoshida | 379/100 |
| 4,821,312 | 4/1989 | Horton et al. | 379/93 |
| 4,868,865 | 9/1989 | Ogawa et al. | 379/100 |
| 5,014,296 | 5/1991 | Saigano | 379/100 |

FOREIGN PATENT DOCUMENTS

| | | |
|---|---|---|
| 0310001 | 4/1989 | European Pat. Off. |
| 0318661 | 6/1989 | European Pat. Off. |
| 61-177065 | 8/1986 | Japan |
| 2169174 | 7/1986 | United Kingdom |
| 2212698 | 7/1989 | United Kingdom |
| 2213681 | 8/1989 | United Kingdom |

*Primary Examiner*—James L. Dwyer
*Assistant Examiner*—Wing F. Chan
*Attorney, Agent, or Firm*—Edward W. Goodman

[57] ABSTRACT

A selector circuit is arranged between a telecommunication subscriber line and a telephone set and a facsimile device. The selector circuit includes a tone detector and a voice detector and circuitry for connecting the subscriber line to the telephone set or the facsimile device depending on the output of the voice detector alone or the outputs of both the voice and tone detectors. In a first state, known as telephone priority, the selector circuit responds to an incoming call by sending a return message as to whether facsimile transmission is desired. The tone and voice detectors are then activated, and if either a voice signal or a tone signal is detected, the selector circuit connects the subscriber line to the facsimile device. Otherwise, the subscriber line is connected to the telephone set. In a second state, known as facsimile priority, the selector circuit responds to an incoming call by sending a return message as to whether telephone communications are desired. The voice detector is then activated, and if a voice signal is detected, the selector circuit connects the subscriber line to the telephone set. Otherwise, the subscriber line is connected to the facsimile device.

3 Claims, 2 Drawing Sheets

ARRANGEMENT FOR CONNECTING A TELEFAX DEVICE OR A TELEPHONE SET TO A TELECOMMUNICATION LINE

BACKGROUND OF THE INVENTION

1. Field of the Invention

The invention relates to an arrangement for optionally connecting a facsimile device or a telephone set to a telecommunication subscriber line, comprising a line input for connecting the subscriber line, a telephone output for connecting the telephone set and comprising a telefax output for connecting the facsimile device.

The invention likewise relates to a facsimile device comprising such a

2. Description of the Related Art

Facsimile devices are widely known. It is customary to connect a facsimile device to its own subscriber line intended for this purpose. In that case the facsimile device has its own telephone number. A disadvantage of this manner of connection is the entailing cost: both from the subscriber's point of view who has to pay for an additional subscriber connection and from a public point of view because for this purpose a telecommunication line is laid out which will not be utilised intensively. (In practice telefax lines are used much less intensively than telephone lines).

It is also possible to connect a telefax device and a telephone set to a single subscriber line. In that case the telefax device and the telephone set have the same telephone number. The connection between either of these devices and the subscriber line is then realized by means of a so-called splitter, the subscriber then regulating whether the telefax device or the telephone set is connected to the subscriber line. With this type of connection, it is a detrimental effect that automatic telefax calls cannot be processed automatically (if the telephone set is connected to the subscriber line) or, alternatively, that the subscriber cannot be reached over the telephone (if the telefax device is connected to the-subscriber line).

SUMMARY OF THE INVENTION

It is an object of the invention to augment the applications of a telecommunication subscriber line, while automatic completion of the telefax traffic is possible and, at the same time, without the subscriber's intervention, automatic telephone traffic on the same line remains possible.

For this purpose the arrangement according to the invention is characterized in that it comprises:
- a line seizing circuit for seizing the subscriber line in response to a call signal from the subscriber line;
- first detection means for detecting voice signals or predetermined tone signals, this first detection means Produce a first connection control signal on detection of said signals and producing a second connection control signal in all further cases;
- second detection means for detecting voice signals, this second detection means producing a second connection control signal on detection of voice signals and producing the first connection control signal in all further cases;
- connection means connected to the two detection means, for establishing a connection between the line input and the telefax output in response to the first connection control signal and for establishing a connection between the line input and the telephone output in response to the second connection control signal; and
- selection means for switching the first or second detection means operative as desired by the user.

Two different operating states can be realized by the selection means. Once the first detection means have been switched operative, the incoming call will be switched to the telephone set unless voice signals or telefax tones are detected. In this operating state, the use of the subscriber line for telephone purposes is given priority. Once the second detection means have been switched operative, the incoming call will be switched to the telefax device unless a voice signal is detected. In this operating state, the use of the subscriber line for telefax purposes is given priority.

When implementing the above measures, a number of advantages are achieved. The first advantage is found in the cost-effectiveness with respect to a separate line for the facsimile device, because now only a single telecommunication line is necessary, both for telephone and facsimile. Automatic processing of both facsimile traffic and telephone traffic is likewise Possible without the subscriber's intervention. A second advantage is found in the fact that anyone who already had a separate telefax subscriber line now has the disposal of an additional telephone line when utilizing the invention. If necessary, this additional telephone line may be used for arranging a so-called ex-directory telephone number so that emergency telephone traffic may be effected over this additional telephone line A third advantage is found in creating the possibility of a so-called "night operation" for the relevant telecommunication line For that matter, there is a possibility that the calling telefax device is a device of a type that does not transmit signals itself after the call has been made but waits for signals from the called station. For example, this is the case with equipment not operating according to CCITT Recommendations. If the user of the receiving telefax has switched the second detection means operative via the selection means, no voice signal will be detected after the call from a subscriber line so that the first connection control signal will be Produced. Consequently, as desired, a connection will be established between the subscriber line and the receiving telefax device. Even automatically operating telefax devices (thus according to the CCIII Standard) are switched in this manner because after the second answering text no voice signals are detected but only tone signals which are distinguished from the voice signals. In neither of these cases the user's telephone will ring.

The advantage of the additionally available telephone line particularly manifests itself if the arrangement according to the invention is contained in a telefax device so that the user, when purchasing this device, at the same time has the disposal of an additional telephone connection.

BRIEF DESCRIPTION OF THE DRAWINGS

The invention will now be further explained with reference to the Figures, in which.

DESCRIPTION OF THE PREFERRED EMBODIMENT

Figure 1:
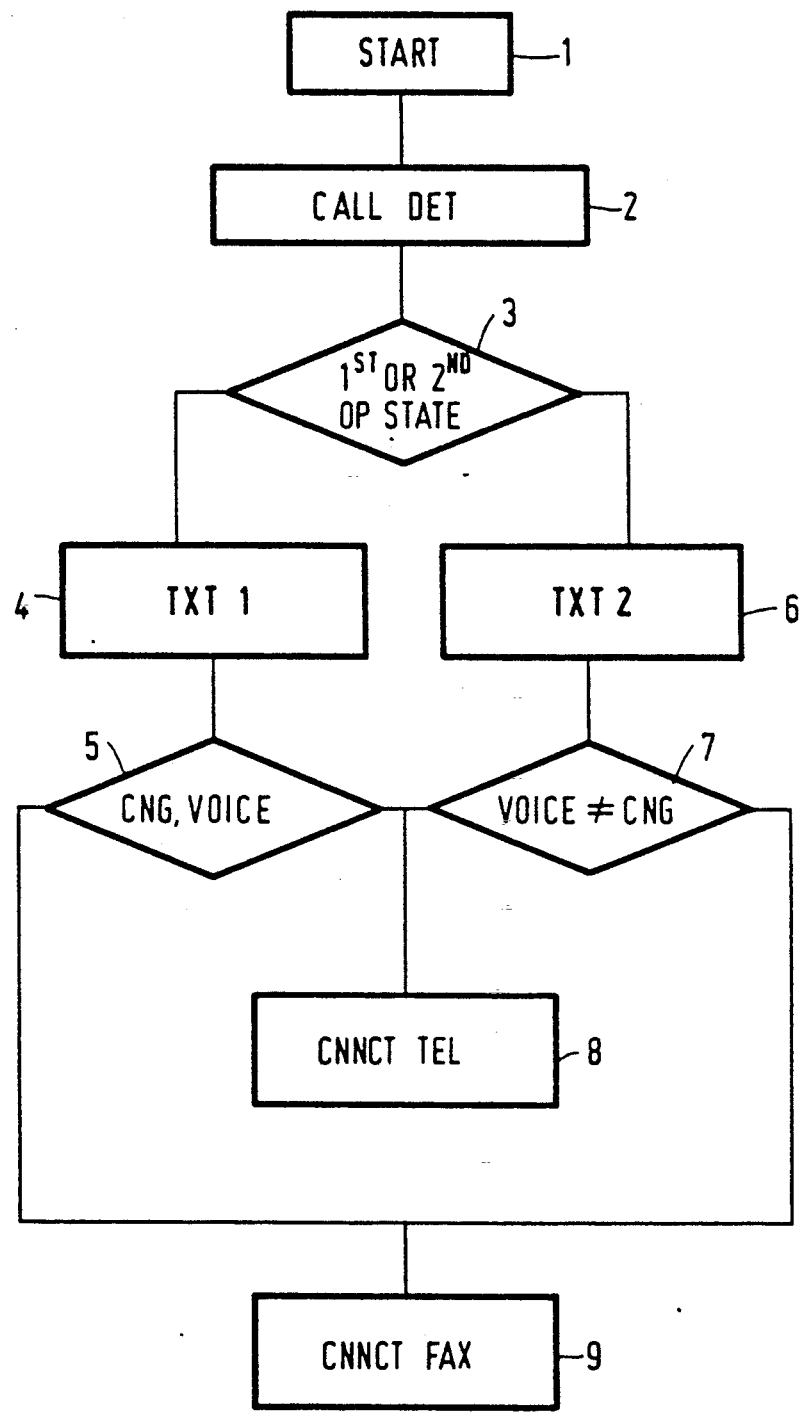
FIG. 1 shows a flowchart illustrating the operation of the arrangement according to the invention.

In the flowchart as shown in FIG. 1 the blocks have the following connotations:

| Block No. | Legends | Connotation |
|---|---|---|
| 1 | START | Beginning of the flow chart, the arrangement waits for a call from the subscriber line. |
| 2 | CALL DET | A call from the subscriber line is detected. |
| 3 | 1ST OR 2ND OP STATE | Choice between the first and second operating state. |
| 4 | TXT 1 | The first answering text is transmitted. |
| 5 | CNG, VOICE | It is verified whether facsimile tones or voice signals are detected after the first answering text. |
| 6 | TXT 2 | A second answering text is transmitted. |
| 7 | VOICE ≠ CNG | It is verified whether voice signals are detected. |
| 8 | CNNCT TEL | A connection is established between the telephone set and the subscriber line. |
| 9 | CNNCT FAX | A connection is established between the subscriber line and the facsimile device. |

Once the arrangement according to the invention (to be termed "selector circuit" hereinafter) has been connected to the subscriber line, to the telephone set and to the facsimile device and Put into operation, the selector circuit waits for a call from the subscriber line to appear (block No. 1). If a call from the subscriber line appears (block No. 2), the further processing of this call depends on the operating state set by the user (block No. 3). In the scope of the invention, two operating states are Possible: the first operating state is termed telephone priority, the second operating state is termed fax priority.

If telephone priority has been set by the user, it is Possible that the selector circuit transmits an answering text (block No. 4). This answering text might, for example, read as follows: "If You wish to send a facsimile-message, state fax". However, it is alternatively possible that this answering text is not transmitted. The processing of the telecommunication call is now further Proceeded with in a detection Phase (block No. 5). In this detection Phase the selector circuit detects signals coming from the subscriber line. If the call is made by an automatic fax, the selector circuit will detect facsimile tones and the subscriber line will be switched to the facsimile device (block No. 9). If the detection Phase is Preceded by an answering text, there will be a possibility that the selector circuit detects voice signals during the detection Phase. In that case the voice signals are assumed to contain the word fax and the facsimile device will thus be switched to. In this manner manually operated facsimile devices can be connected. If neither facsimile tones nor voice signals are detected, it is assumed that the incoming call is a telephone call and the subscriber line will be connected to the telephone set (block No. 8). The connotation of telephone priority is derived from the fact that the telephone set is always connected to unless there are signals on the subscriber line that induce connection to the facsimile device.

In the second operating state it is likewise Possible to send an answering text to the subscriber line (block No. 6). This answering text could read, for example: "If you wish to telephone say telephone". The sequel to the handling of the telecommunication call in this second operating state takes Place in a detection Phase (block No. 7). During this detection Phase the selector circuit is arranged for detecting voice signals. If a voice signal is detected, the caller is assumed to have stated that he wishes to telephone and be switched to the telephone set. In the absence of detected voice signals, the telefax device will be switched to. In principle it may be assumed that any sound having a certain minimum time duration is a voice signal. However, in order to avoid that incoming traffic from an automatic telefax device that sends out telefax tones is switched through to the telephone set, a distinction between voice signals and telefax tones is to be made during the voice signal detection Phase according to block No. 7. When voice signals are detected, detection of sound signals which are not fax tones may thus suffice. The term of fax priority is due to the fact that in all cases the facsimile device is switched to unless voice signals are detected which leads to the telephone set being switched to.

Omission of the first answering text (block No. 4) would create the possitility of an ex-directory telephone number. The callers who have been informed of this possibility only need to remain silent after making the call because they know that they will then be switched automatically to the telephone set.

Also in the second operating state it is Possible to omit the answering text (block 6). The user then has the possitility to render himself unreachable over the telephone. Any caller who is not informed of this option will then be switched to the facsimile device and will subsequently disconnect.

Figure 2:
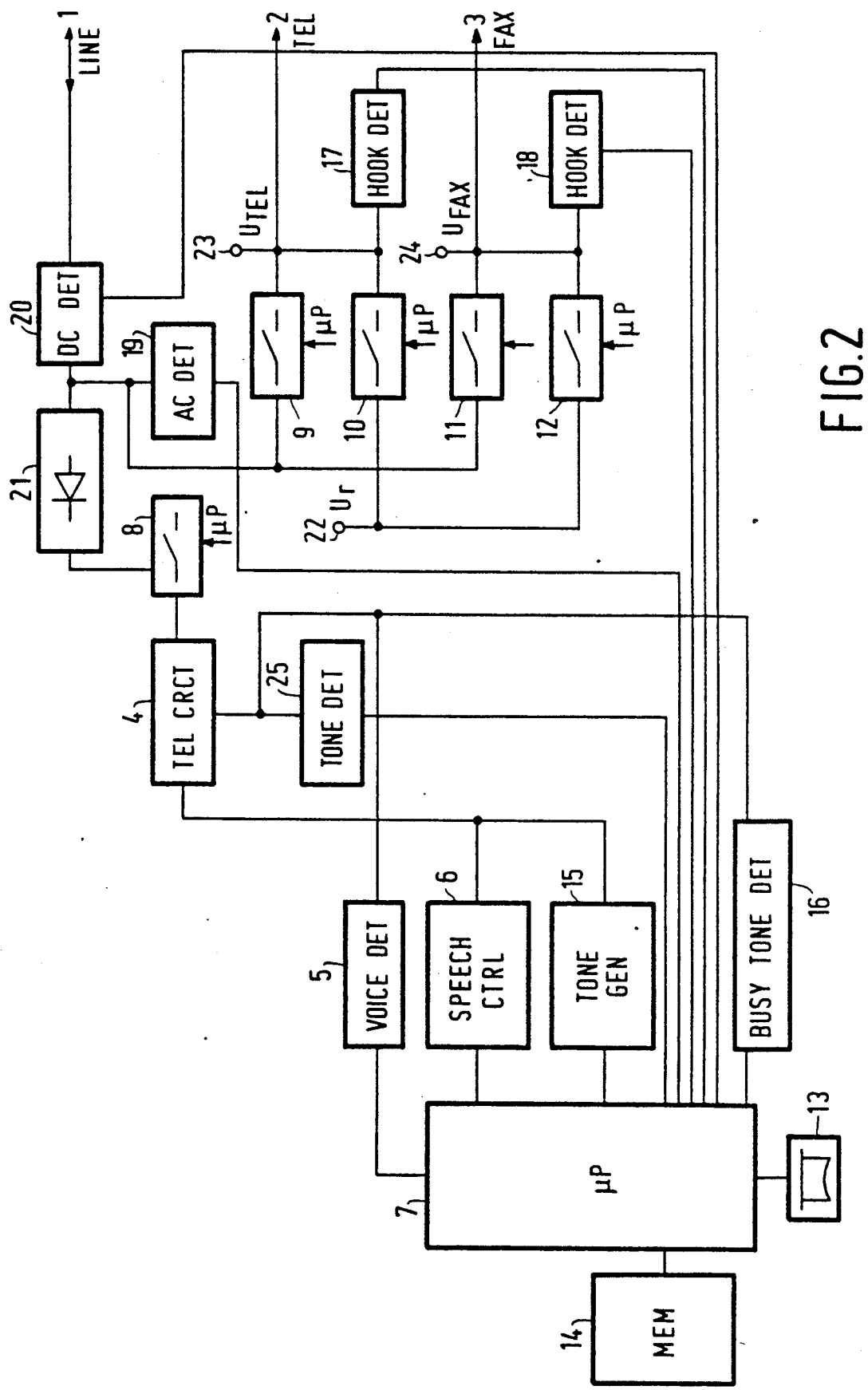
FIG. 2 shows a block diagram of the arrangement according to the invention.

FIG. 2 shows a block diagram of the selector circuit according to the invention. The selector circuit comprises a line input 1 for connecting the subscriber line, a telephone output 2 for connecting a telephone set and a telefax output 3 for connecting a facsimile device.

The line input 1 is connected to a DC detector 20 which in turn is connected to a rectifier circuit 21. To the output of DC detector 20 is also connected an AC detector 19 for detecting ringing signals. Via DC detector 20 line input 1 is also connected to switches 9 and 11 for connecting the telephone set and the facsimile device, respectively; these switches 9 and 11 are controlled by a microprocessor 7.

The control of the selector circuit according to the invention is effected by microprocessor 7 comprising the software necessary for this purpose. This software Provides the implementation of the flowchart as shown in FIG. 1. By means of the control key 13, the user may feed indications to the memory 14 belonging to the microprocessor 7, as a result of which indications, the desired program run (operating state) is achieved. For microprocessor 7, any type of customary commercially available Processor may be used. For memory 14, an EEPROM memory of the type NMC 9306 (16×16bits) may be used.

The selector circuit further includes a telecommunication circuit 4 connected to line input 1 via a Processor-controlled switch 8, the rectifier 21 and DC detector 20. Telecommunication circuit 4 Performs a number of telecommunication functions: maintaining a DC current Path for seizing the subscriber line, sending signals to the subscriber line and receiving signals therefrom. This circuit likewise Provides the required line terminating impedance. Such circuits are of common knowledge; a commercially available circuit is, for example, the PhiliPs TEA 1061 circuit. Telecommunication circuit 4 has an output connected to the tone detection circuit 25 whose output is connected to microprocessor 7.

The selector circuit according to FIG. 2 further includes a voice detection circuit 5 controlled by microprocessor 7 and whose output applies signals to this microprocessor. The input of voice detection circuit 5 is connected to the signal output of the telecommunication circuit 4. Voice detection circuits may generally be arranged for distinguishing the human voice from other sounds, or distinguishing specific words or word groups in the voice signals. In the scope of the invention it is not important which type of voice detection circuit is used.

The voice detection circuit used here is a circuit establishing the envelope of the incoming signal, insofar this signal exceeds a specific threshold. Such circuits are of common knowledge and easy to realize for those skilled in the art. The envelope thus obtained is then applied to microprocessor 7 performing the evaluation of this signal.

The selector circuit further includes a speech controller 6 controlled by microprocessor 7 and whose output is connected to the signal input of telecommunication circuit 4.

Speech controller 6 may be arranged as the combination of a speech memory and a speech controller connected thereto. The digital signal produced by the speech controller is then Processed into a voice signal by means of proper amplification and filtering. The speech memory used is a customary 256 kbit EPROM of the 27 C 256 type; the speech controller is, for example, the commercially available speech controller UM 5100 manufactured by United Microelectronics Corporation.

The selector circuit as shown in FIG. 2 further includes a tone generator 15 controlled by the microprocessor 7. The output of this tone generator 15 is connected to the input of telecommunication circuit 4. The tone generator 15 is formed, for example, by a combination of a suitable output of microprocessor 7 producing the desired (digital) frequency and a filter for converting the digital signal into a sinusoidal signal. The signal output of telecommunication circuit 4 is also connected to a busy tone detector 16 (formed by a series connection of a bandpass filter and an envelope detector) whose output is connected to microprocessor 7.

An off-hook detector 17 or 18, respectively, is connected to the telephone output 2 and the fax output 3, for ascertaining the hook contact of the connected telephone set or facsimile device. Supply voltage terminals 23 and 24 for feeding the telephone set and the facsimile device are also connected to said outputs. Also for the benefit of the two said outputs, a ringing voltage terminal 22 is connected for supplying the ringing voltage to the telephone set or facsimile device, respectively. This ringing voltage is applied via a switch 10 or 12, respectively, which switches are controlled by microprocessor 7.

microprocessor 7 further includes the memory 14 and the control key 13. This control key may be used by the user to set a desired operating state.

If a telecommunication call in the form of a ringing signal arrives at line input 1, this ringing signal is recognized by AC detector 19 which sends a signal to microprocessor 7 in response thereto. As a reaction, microprocessor 7 sends out a signal to the Processor-controlled switch 8 which establishes a connection between telecommunication circuit 4 and line input 1. Telecommunication circuit 4 establishes a DC Path for the subscriber line as a result of which the subscriber line is seized.

The further handling of the telecommunication traffic by the selector circuit depends on the operating state set by the user by means of the control key 13. It is assumed that the operating state with telephone priority is switched on. Now it is Possible, not necessary though, that a first answering text is sent out in which the calling party is invited to state that he wishes to send a facsimile message. This answering text is sent on the initiative of the microprocessor 7 which sends a control signal to speech generator 6 which sends the answering text through telecommunication circuit 4 to the subscriber line through line input 1. Once the first answering text has been sent, microprocessor 7 activates the voice detection circuit 5 and tone detection circuit 25 to detect voice and/or tone signals. If either of these circuits or both circuits detects/detect the relevant signal, it/they sends/send a signal to microprocessor 7 which, in turn, renders switch 12 conductive (closed) in response thereto. Consequently, the ringing voltage through input 22 is sent to fax output 3, so that the fax device is called up. If off-hook detector 18 detects the facsimile device answering the call, this circuit sends a signal to microprocessor 7 which, in response thereto, renders switch 12 non-conductive and switch 11 conductive. This establishes the connection between the subscriber line and the facsimile device.

Alternatively, it is possible that during the detection phase neither the voice detector 5 nor tone detector 25 has detected a signal. In that case microprocessor 7 renders switch 10 conductive, so that the ringing voltage is applied to telephone output 2 through input 22. If off-hook detector 17 ascertains that the call is answered by the telephone set, this detection circuit will send a signal to microprocessor 7 as the result of which switch 10 will be opened and switch 9 will be closed. Consequently, a connection has been established between the subscriber line and the telephone set through telephone output 2.

Now it is assumed that the user of the selector circuit has set the operating state to fax priority. After the subscriber line has been seized under the control of the microprocessor 7, a second answering text may, not necessarily though, be sent out. This answering text may contain an invitation to the calling party to state whether a telephone connection is desired. Subsequently, the microprocessor 7 activates the voice detector 5 to detect any voice signals during the detection phase that now follows. If voice detector 5 detects voice signals, it will send a signal ti microprocessor 7 which, in response thereto, will activate switches 10 and 9 in the way described hereinbefore with respect to the operating state with telephone priority. If no voice signals are detected by the voice detector 5, microprocessor 7 will control the switches 11 and 12 as a result of which a telefax connection will be established between line input 1 and the facsimile output 3, as described with reference to the operating state with telephone priority.

Once the exchange of information has been terminated, the calling party may disconnect the telecommunication connection. In that case line input 1 will receive busy tones detected by the busy tone detector 16 in response to which this detector will send a corresponding signal to microprocessor 7. In response thereto microprocessor 7 will send out a signal to switch 8 and/or 9 and/or 11, due to which the subscriber line will no longer remain engaged. This will terminate the telecommunication connection.

There is a possibility that a facsimile device connected to the telefax output 3 falls out of operation, for example, because the quantity of paper of the device has been used up. If such a facsimile device is able to detect this situation (as is the case with virtually all facsimile devices), this device will change to an operating state in which calls (this is the supply of ringing voltage) are no longer answered. In that case, however, a call from the subscriber line would already be answered by the detector circuit seizing this line whereas Yet no telefax connection is being established. However, the cost of establishing a connection is nevertheless charged to the calling party. In order to avoid constant (vain) attempts at establishing a connection being made by automatic calling telefax equipment (with the attendant cost), the selector circuit includes measures to that effect.

The call to the fax output is made, for example, with a ringing voltage of which the generation is controlled by microprocessor 7. Answering this call is detected by off-hook detector 18. A vain call is made if the call has not been answered within a given Period of time after the beginning of the call. already after a single vain call it may be decided that the facsimile device has fallen out of operation but, alternatively, it is possible to do so after two or three vain attempts. A call which may be vain because the facsimile device was just carrying out another task (for example, printing a survey of received calls) will then not immediately lead to the out-of-operation decision. After the Predetermined number of consecutive vain calls, microprocessor 7 will render switch 10 constantly conductive as a result of which the combination of the selector circuit and the connected telephone set behaves like an ordinary telephone set. This Prevents that automatic calling telefax devices repeatedly try to establish a connection.

If, induced by a call from the subscriber line, the selector circuit changes to sending a call signal (ringing voltage) to the telephone output 2, it is Possible to send simultaneously a tone signal to the line input 1. The calling party will then know that the telephone call is in the Phase in which it is being actively dealt with. This tone signal may have a frequency and a repetition rate which are equal to that of the Public network. Alternatively, it is possible, however, to have them clearly distinguished therefrom so as to fulfill the requirements made by specific network managements. Both magnitudes (frequency and repetition rate) may be attained by a suitable processor memory-setting known per se.

We claim:

1. A selector circuit for optionally connecting a facsimile device or a telephone set to a telecommunication subscriber line, comprising a line input for connecting the subscriber line, a telephone output for connecting the telephone set and comprising a telefax output for connecting the facsimile device, characterized in that said selector circuit comprises:

a line seizing circuit for seizing the subscriber line in response to a call signal from the subscriber line;

first detection means for detecting voice signals or predetermined tone signals, said first detection means producing a first connection control signal on detection of said voice signals or said predetermined tone signals and producing a second connection control signal in all further cases;

second detection means for detecting voice signals, said second detection means producing said second connection control signal on detection of voice signals and producing said first connection control signal in all further cases;

connection means connected to the two detection means, for establishing a connection between the line input and the telefax output in response to said first connection control signal and for establishing a connection between the line input and the telephone output in response to said second connection control signal; and selection means for activating said first or second detection means as desired by the user.

2. A selector circuit as claimed in claim 1, characterized in that said selector circuit comprises:

means for detecting a predetermined number of consecutive vain calls to the telefax output and for producing an out-of-operation signal on detection of subsequent vain calls;

means for establishing a connection between the line input and the telephone output in response to said out-of-operation signal, said connection being terminated only by the intervention of the user; and means for terminating the permanent connection under the control of a control unit.

3. Facsimile device comprising a selector circuit as claimed in claim 1 or 2.

* * * * *